United States Patent [19]

Yamamoto

[11] Patent Number: 5,056,013

[45] Date of Patent: Oct. 8, 1991

[54] IN-CIRCUIT EMULATOR

[75] Inventor: Mitsuhiro Yamamoto, Tokyo, Japan

[73] Assignee: NEC Corporation, Tokyo, Japan

[21] Appl. No.: 435,959

[22] Filed: Nov. 14, 1989

[30] Foreign Application Priority Data

Nov. 14, 1988 [JP] Japan .................... 63-288585

[51] Int. Cl.⁵ ............................................. G06F 11/00
[52] U.S. Cl. ................................. 364/200; 364/247;
364/247.6; 364/260; 364/259.2; 364/267.91;
371/16.2; 371/19
[58] Field of Search ... 364/200 MS File, 900 MS File;
371/12-14, 16.1, 16.2, 16.5, 19, 20, 29.1

[56] References Cited

U.S. PATENT DOCUMENTS

| 4,205,370 | 5/1980 | Hirtle | 364/200 |
|---|---|---|---|
| 4,453,093 | 6/1984 | Boudreau | 371/19 |
| 4,571,677 | 2/1986 | Hirayama et al. | 364/200 |
| 4,598,364 | 7/1986 | Gam et al. | 371/19 |
| 4,636,940 | 6/1987 | Goodwin, Jr. | 371/19 |
| 4,674,089 | 6/1987 | Doret et al. | 364/200 |
| 4,802,165 | 7/1989 | Ream | 371/19 |
| 4,847,805 | 7/1989 | Ishii et al. | 371/16.2 |
| 4,879,646 | 11/1989 | Iwasaki et al. | 364/200 |
| 4,933,941 | 6/1990 | Eckard et al. | 371/16.2 |

FOREIGN PATENT DOCUMENTS

| 0085437 | 8/1983 | European Pat. Off. | 371/20.4 |
|---|---|---|---|
| 59-77553 | 5/1984 | Japan . | |
| 59-205652 | 11/1984 | Japan . | |
| 60-84643 | 5/1985 | Japan . | |
| 60-262251 | 12/1985 | Japan . | |
| 62-137626 | 6/1987 | Japan . | |
| 62-168243 | 7/1987 | Japan . | |
| 62-286134 | 12/1987 | Japan . | |
| 63-123140 | 5/1988 | Japan . | |
| 63-271553 | 11/1988 | Japan . | |

Primary Examiner—Michael R. Fleming
Assistant Examiner—Ayaz R. Sheikh
Attorney, Agent, or Firm—Foley & Lardner

[57] ABSTRACT

An in-circuit emulator comprising an emulation microprocessor for directly outputting at least an address and an execution level information, a latch circuit for latching at least the execution level information outputted from the emulation microprocessor, a register holding a execution level information to be traced, a comparator receiving respective contents of the latch circuit and the register for generating an enable signal when the execution level information latched in the latch circuit is consistent with the execution level information to be traced of the register, and a trace memory coupled to receive the address outputted from the emulation microprocessor and responding to the enable signal so as to store the address outputted from the emulation microprocessor, whereby only the result of execution belonging to a selected execution level is traced in the trace memory.

2 Claims, 7 Drawing Sheets

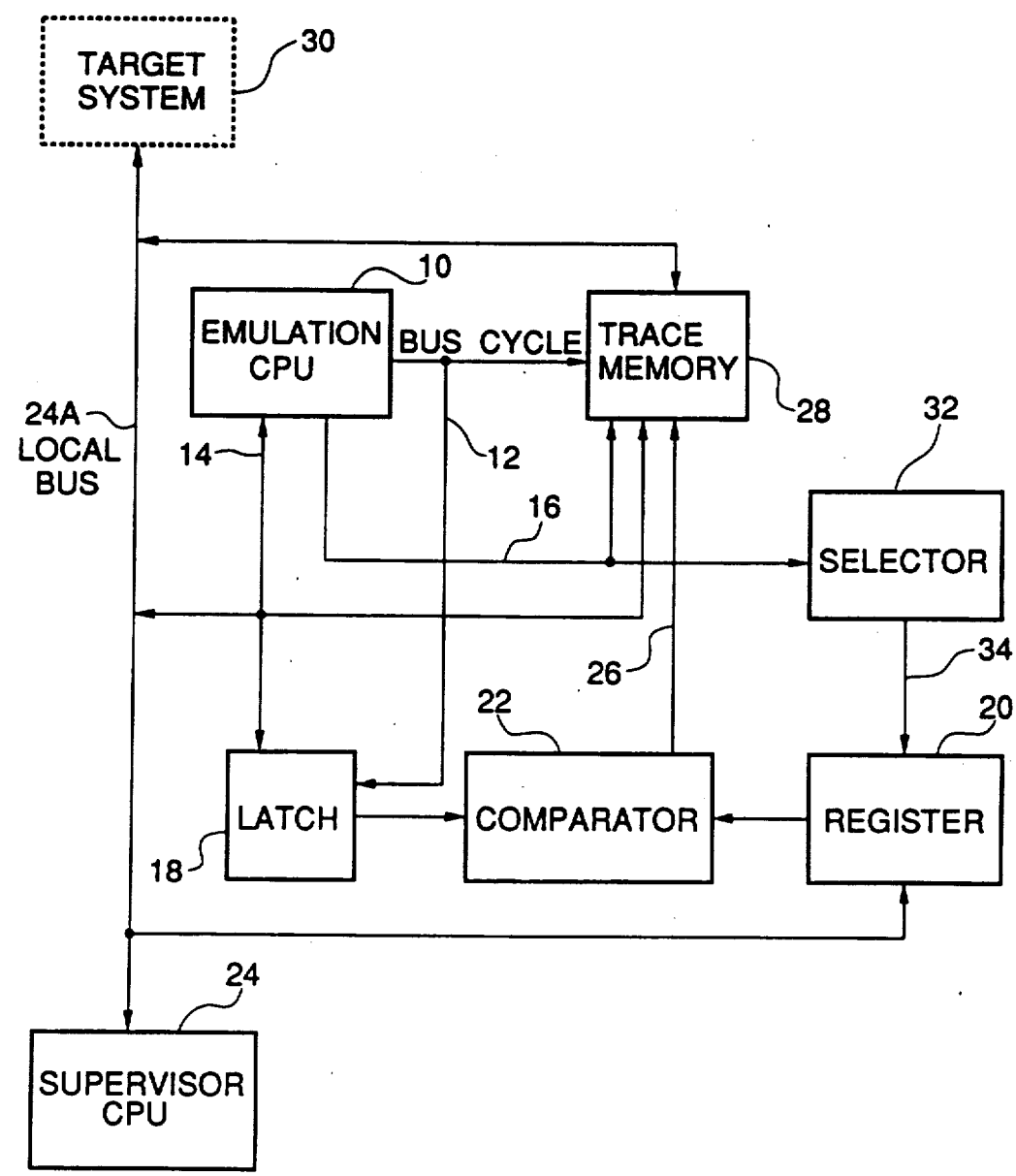

IN-CIRCUIT EMULATOR

BACKGROUND OF THE INVENTION

1. Field of the Invention

The present invention relates to an in-circuit emulator having a memory management mechanism which performs a memory protection by dividing a memory area of a microprocessor into a plurality of areas of a layered structure, and more specifically to such an in-circuit emulator which can perform an on/off control of a trace on the basis of the layer number (called "execution level" hereinafter) of the memory area.

2. Description of Related Art

Conventional in-circuit emulators for a microprocessor, which perform a memory protection by dividing a memory area of the microprocessor into a plurality of areas of a layered structure, can perform an on/off control of a trace on the basis of various conditions including an address and a status. However, since information concerning the execution level is not included in a trace on/off condition, it was not sure where the execution level had changed. Therefore, it was a matter of course that it is not possible to trace only a particular execution level.

Specifically, in the conventional in-circuit emulator for a microprocessor having the above mentioned memory management mechanism, since information of the execution level is not directly from an emulation microprocessor, even if the emulation microprocessor executes a program in which an execution level changes in the way, information concerning where the execution level had changed will not be in a trace data. In particular, when an operating system (OS) and an application program are executed, it is an ordinary matter that the operating system is a high place of execution level and the application program is a low place of execution level. In this case, when only the operating system or only the application system is debugged, it was not possible to trace each or one of the execution levels, separately from each other.

SUMMARY OF THE INVENTION

Accordingly, it is an object of the present invention to provide an in-circuit emulator having a layered memory management, which has overcome the above mentioned defect of the conventional one.

Another object of the present invention is to provide an in-circuit emulator having a layered memory management, which is capable of tracing only the result of execution belonging to a selected execution level, of the result of execution of a program which is executed at a plurality of different execution levels.

The above and other objects of the present invention are achieved in accordance with the present invention by an in-circuit emulator comprising an emulation microprocessor for directly outputting at least an address and an execution level information, a latch circuit for latching at least the execution level information outputted from the emulation microprocessor, a register holding a execution level information to be traced, a comparator receiving respective contents of the latch circuit and the register for generating an enable signal when the execution level information latched in the latch circuit is consistent with the execution level information to be traced of the register, and a trace memory coupled to receive the address outputted from the emulation microprocessor and responding to the enable signal so as to store the address outputted from the emulation microprocessor, whereby only the result of execution belonging to a selected execution level is traced in the trace memory.

According to another aspect of the present invention, there is provided an in-circuit emulator comprising an emulation microprocessor for directly outputting at least an address and an execution level information, a latch circuit for latching at least the address outputted from the emulation microprocessor, a register device composed of a plurality of registers corresponding to different execution levels to be traced, a selector receiving the execution level information outputted from the emulation microprocessor for selecting one of the plurality of registers corresponding to the execution level information, a comparator receiving respective contents of the latch circuit and the selected register for generating an enable signal when the content latched in the latch circuit is consistent with the content of the selected register, and a trace memory coupled to receive the address outputted from the emulation microprocessor and responding to the enable signal so as to store the address outputted from the emulation microprocessor, whereby only the result of execution belonging to a selected execution level is traced in the trace memory.

The above and other objects, features and advantages of the present invention will be apparent from the following description of preferred embodiments of the invention with reference to the accompanying drawings.

BRIEF DESCRIPTION OF THE DRAWINGS

FIG. 6 is a block diagram similar to FIG. 1 but showing a second embodiment of an in-circuit emulator in accordance with the present invention.

DESCRIPTION OF THE PREFERRED EMBODIMENTS

Figure 1:
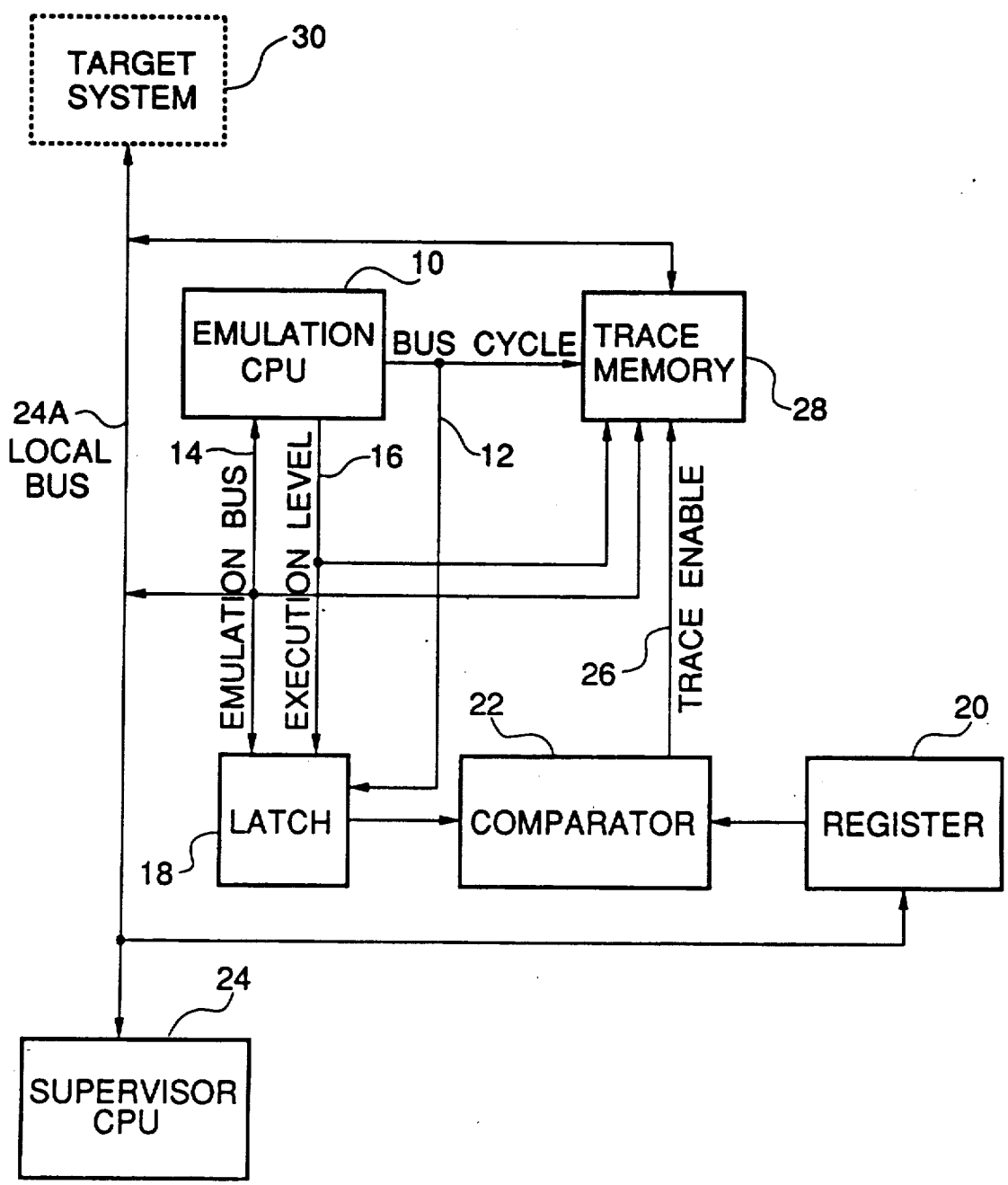
FIG. 1 is a block diagram of a first embodiment of an in-circuit emulator in accordance with the present invention for microprocessor, which performs a memory protection by dividing a memory area of the microprocessor into a plurality of areas in a layered structure.

Referrring to FIG. 1, there is shown a block diagram of a first embodiment of an in-circuit emulator in accordance with the present invention for microprocessor, which performs a memory protection by dividing a memory area of the microprocessor into a plurality of areas of a layered structure. The shown in-circuit emulator includes an emulation microprocessor 10 (called "emulation CPU" hereinafter) which at least outputs a bus cycle start signal $\overline{BCY}$ onto a bus cycle line 12, and an address, data and a status indicative of the condition of the emulation CPU, onto an emulation bus 14. The emulation CPU 10 also outputs an execution level information on a bus 16. In addition, the emulation CPU 10 receives data through the emulation bus 14. The bus cycle start signal $\overline{BCY}$ is inputted to a latch circuit 18, which is coupled to the emulation bus 14 and the execution level information bus 16 so as to latch, in response to the bus cycle start signal $\overline{BCY}$, the address, the status and the execution level information outputted from the emulation CPU 10, and the data inputted to and outputted from the emulation CPU 10.

Furthermore, the in-circuit emulator includes a register 20, which holds a trace condition for tracing input/output signals of the emulation CPU 10. Specifically, the register 20 holds information corresponding to the address, the status, the input/output data and the execution level information latched in the latch circuit 18. In addition, the register 20 is coupled to a local bus 24A so that a content of the register 20 is changed by a supervisor microprocessor or CPU 24. The latch circuit 18 and the register 20 are coupled to a comparator 22 which compares the content of the latch circuit 18 with the content of the register 20 about the address, the status, the input/output data and the execution level information. If the content of the latch circuit 18 is consistent with the content of the register 20, the comparator 22 outputs a trace enable signal 26 to a trace memory 28.

The trace memory 28 is connected to the bus cycle signal line 12, the emulation bus 14 and the execution level information bus 16, so that when the trace enable signal 26 is applied from the comparator 22, the trace memory 28 writes the address, the status, the input/output data and the execution level information in response to the bus cycle start signal $\overline{BCY}$.

The supervisor CPU 24 not only changes the content of the register 22, but also controls various circuits within the in-circuit emulator through the local bus 24A. The local bus 24A is also coupled to a target system to be debugged by the in-circuit emulator.

Figure 2:
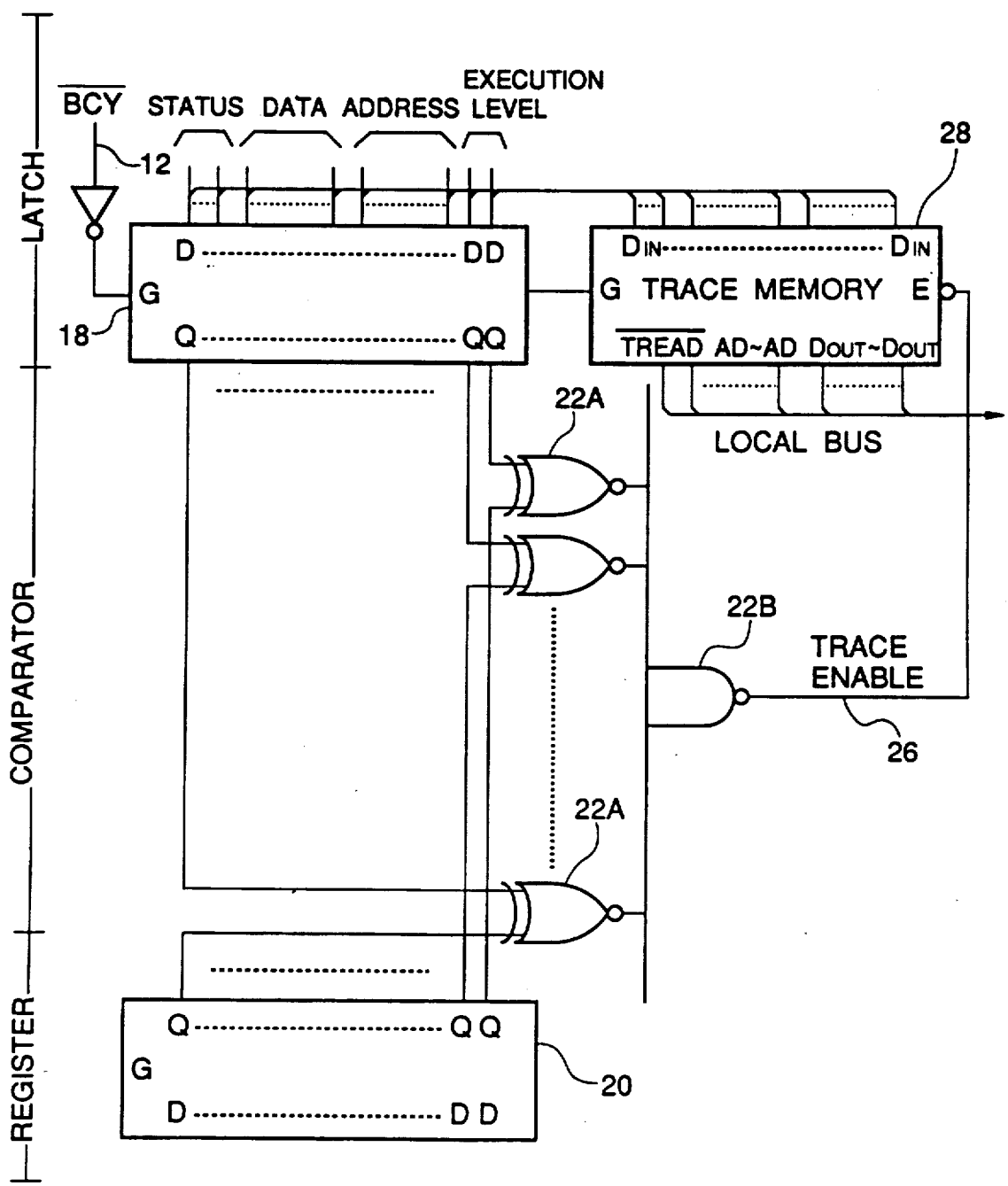
FIG. 2 is a logic circuit diagram illustrating the latch circuit, the comparator and the register used of the in-circuit emulator shown in FIG. 1.

Referring to FIG. 2, there is shown a detailed construction of the the latch circuit 18, the comparator 22 and the register 20. The latch circuit 18 is composed of an array of registers having data inputs D connected to receive the status, the data and the address which are outputted to the emulation bus 14 from the emulation CPU 10 and the execution level information which is outputted to the execution level information bus 16 from the emulation CPU 10. The bus cycle start signal $\overline{BCY}$, which is an active low signal, is applied through an inverter to a gate terminal G of the latch circuit 18, so that when the bus cycle start signal $\overline{BCY}$ is rendered active, the latch circuit 18 latches respective data bits applied to the data inputs D, thereby to output the latched data bits from respective Q outputs. Each of the Q outputs of the latch circuit 18 is connected to one input of a corresponding exclusive-OR gate 22A, which has the other input connected to receive a corresponding Q output of the register 20. Outputs of all the exclusive-OR gates 22A are connected to inputs of an NAND circuit 22B, which has an output connected to an enable terminal E of the trace memory 28. Therefore, the exclusive-OR gates 22A and the NAND circuit 22B form the comparator 22 which generates the trace enable signal 26 of the active low type when all the Q outputs of the latch circuit 18 are consistent with the corresponding Q outputs of the register 20.

Figure 3:
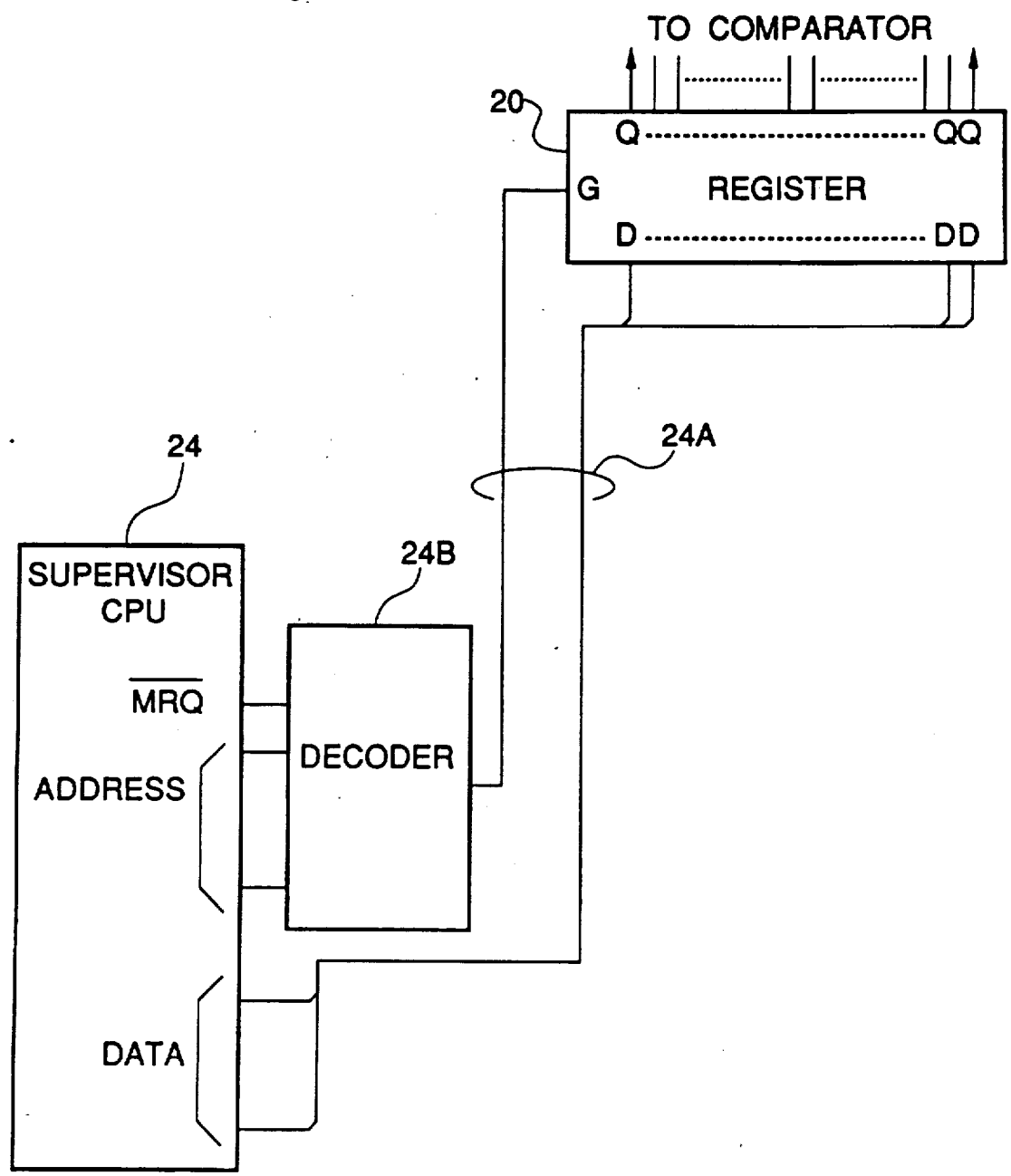
FIG. 3 is a block diagram of an arrangement for writing the register used in the in-circuit emulator shown in FIG. 1.

Turning to FIG. 3, there is shown an arrangement for writing the register 20 used in the in-circuit emulator shown in FIG. 1. The supervisor CPU 24 operates to write data to the register 20 as if the register 20 were one input/output device. Date terminals of the supervisor CPU 24 are coupled to respective corresponding data terminals D of the register 20 through the local bus 24A. On the other hand, an address of the supervisor CPU 24 is decoded by a decoder 24B, so that when the decoder 24B detects that the address outputted by the supervisor CPU 24 is directed to the register 20, the decoder outputs a write signal to a gate terminal G of the register 20. For example, when the write signal is at a low level, so that the data inputted to the data terminals D is outputted from the Q terminals of the register 20 as it is. On the other hand, when the write signal is at a high level, the register 20 operates to hold the data inputted to the data terminals D.

Figure 4:
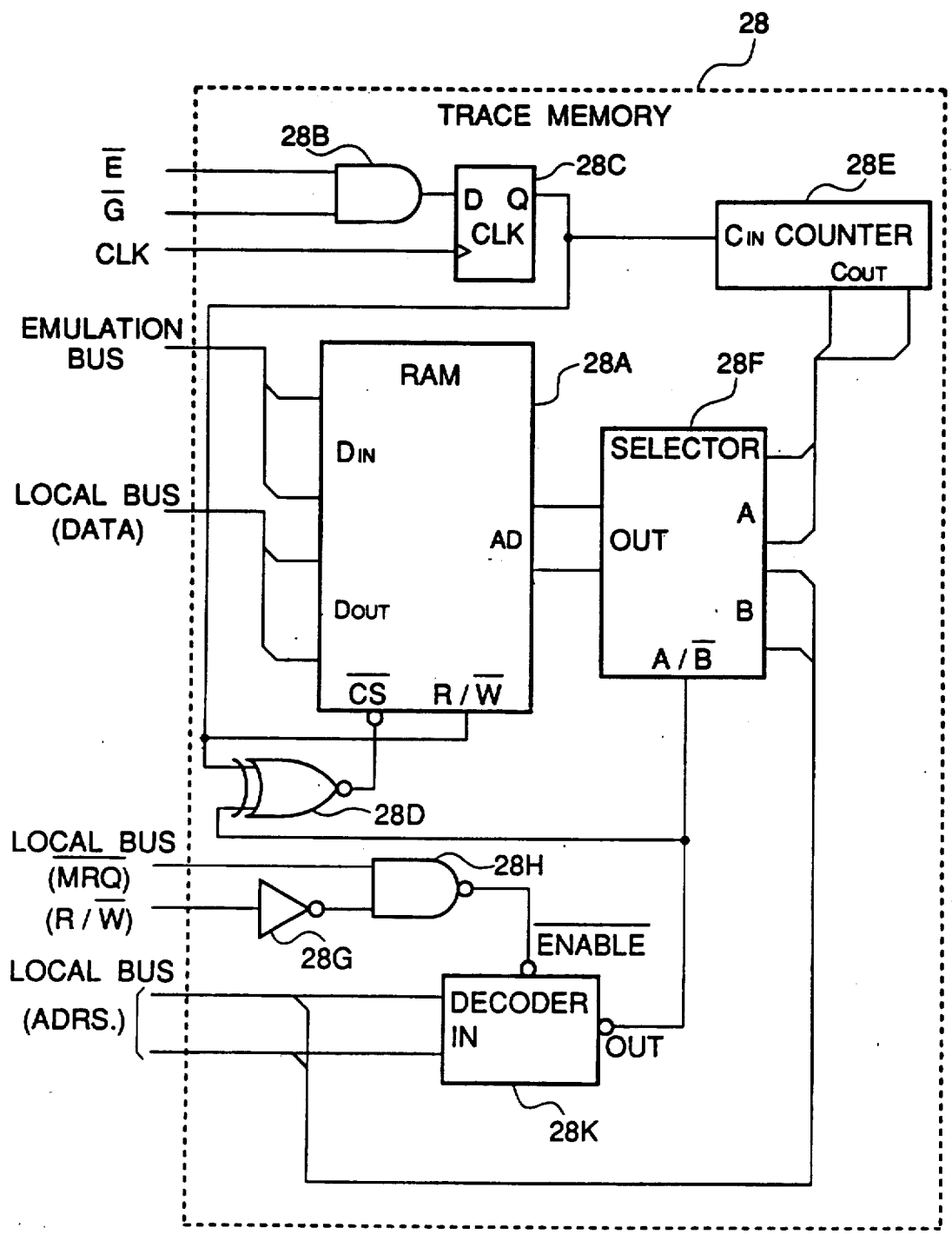
FIG. 4 is a block diagram of the trace memory used in the in-circuit emulator shown in FIG. 1.

Referring to FIG. 4, there is shown a detailed block diagram of the trace memory 28 used in the in-circuit emulator shown in FIG. 1. The trace memory 28 includes a dual port random access memory (RAM) 28A having an input port and an output port independent of each other. An input port $D_{IN}$ of the RAM 28A is coupled to the emulation bus 14 and the execution level bus 16, and an output port $D_{OUT}$ of the RAM is coupled to the local bus 24A.

Figure 5A:
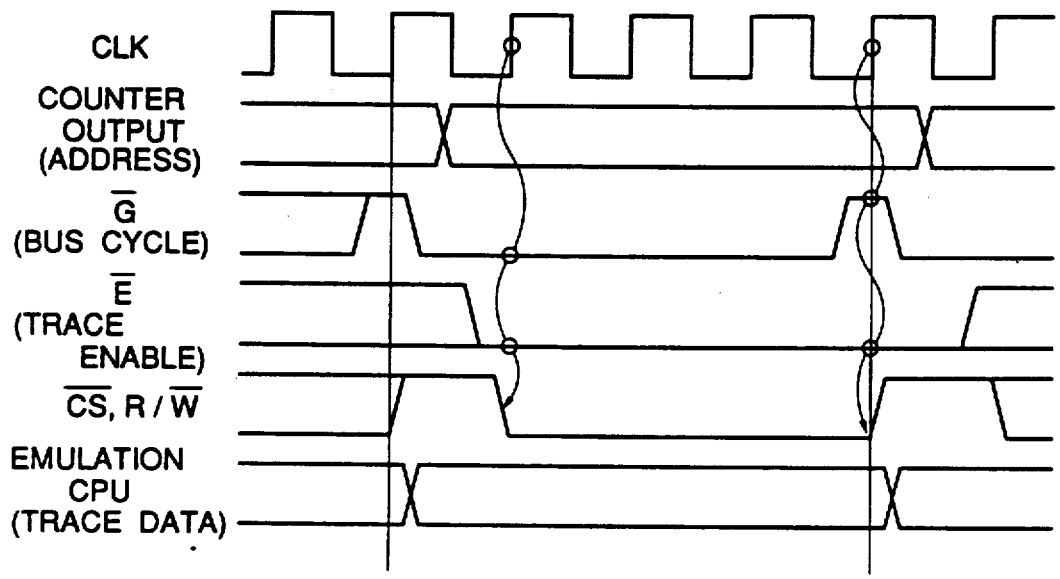
FIGS. 5A and 5B are timing charts illustrating the operation of the trace memory shown in FIG. 4.

When the result of execution is to be traced, the trace enable signal 26 (a terminal E) and the bus cycle start signal $\overline{BCY}$ (the trace timing signal; a terminal G) are supplied through an AND gate 28B to a D terminal of a D-type flipflop 28C, which has a clock terminal CLK connected to receive a system clock CLK of the emulation CPU 10. A Q output of the flipflop 28C is connected directly to a read/write terminal $R/\overline{W}$ of the RAM 28A, and through an exclusive NOR gate 28D to a chip select terminal $\overline{CS}$ of the RAM 28A. Namely, the chip select $\overline{CS}$ and the read/write signal $R/\overline{W}$ are generated by synchronizing the trace enable signal 26 (E) and the trace timing signal $\overline{BCY}$ (G) with the system clock CLK of the emulation CPU 10. On the other hand, the Q output of the flipflop 28C is connected to a count input $C_{IN}$ of a counter 28E, which operates to count the clock inputted to the terminal G so that a count output $C_{OUT}$ generates an address for the trace memory, which is supplied through a selector 28F to an address terminal AD of the RAM 28A. Thus, date on the emulation bus 14 and the execution level bus 16 is written through the input port $D_{IN}$ to the RAM 28A. One example of a timing chart of the above mentioned writing of the trace memory is illustrated in FIG. 5A.

Figure 5B:
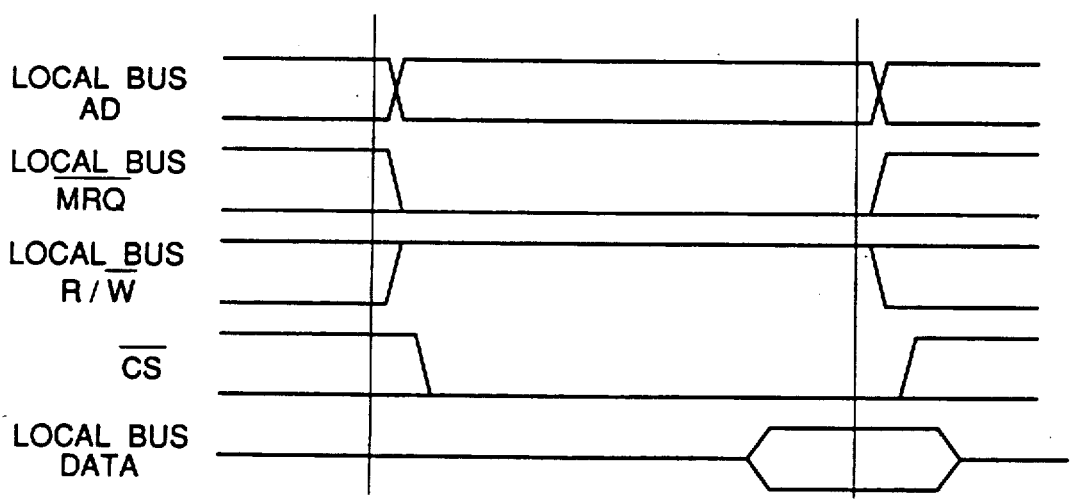

On the other hand, when data stored in the trace memory 28 is read out, the supervisor CPU 24 outputs an address, a memory request $\overline{MRQ}$ and a read/write signal $R/\overline{W}$ onto the local bus 24A. The address on the local bus 24A is coupled to the selector 28F. The memory request $\overline{MRQ}$ and the read/write signal $R/\overline{W}$ on the local bus 24A are inputted to a NAND gate 28H directly and through an inverter 28G, respectively. An output of the NAND gate 28H generates an enable signal to a decoder 28K, which has an input coupled to receive the address on the local bus 24A. When the decoder 28K is enabled, the decoder 28K decodes the address on the local bus 24A, and if the address on the local bus 24A is directed to the trace memory 28, the decoder 28K outputs an selection signal to the selection terminal $A/\overline{B}$ of the selector 28F, so that the selector 28F supplies the address on the local bus 24A to the address input AD of the RAM. As a result, data corresponding to a given address is outputted from the output port $D_{OUT}$ of the RAM 28A. One example of a timing chart of the above mentioned reading of the trace memory is illustrated in FIG. 5B.

Returning to FIGS. 1 and 2, execution level bits of the register 20 is set with an execution level number to be traced, in accordance with the register setting operation explained with reference to FIG. 3. On the other hand, the other bits of the register 20 which have not been set are treated as "don't care". As a result, if the execution level number set in the register 20 is consistent with the execution level number latched in the latch circuit 18, the comparator 22 outputs an active low enable signal 26 to the trace memory 28, so that the content latched in the latch circuit 18 is written to the trace memory 28.

As seen from the above, the latch circuit 18 operates to latch the address, the status, the input/output data and the execution level of the emulation CPU 10 at each bus cycle, namely, at each time that the bus cycle start signal $\overline{BCY}$ is enabled. However, the trace memory 28 traces only the address, the status, the input/output data and the execution level corresponding to an execution level designated by the register 20.

Figure 7:
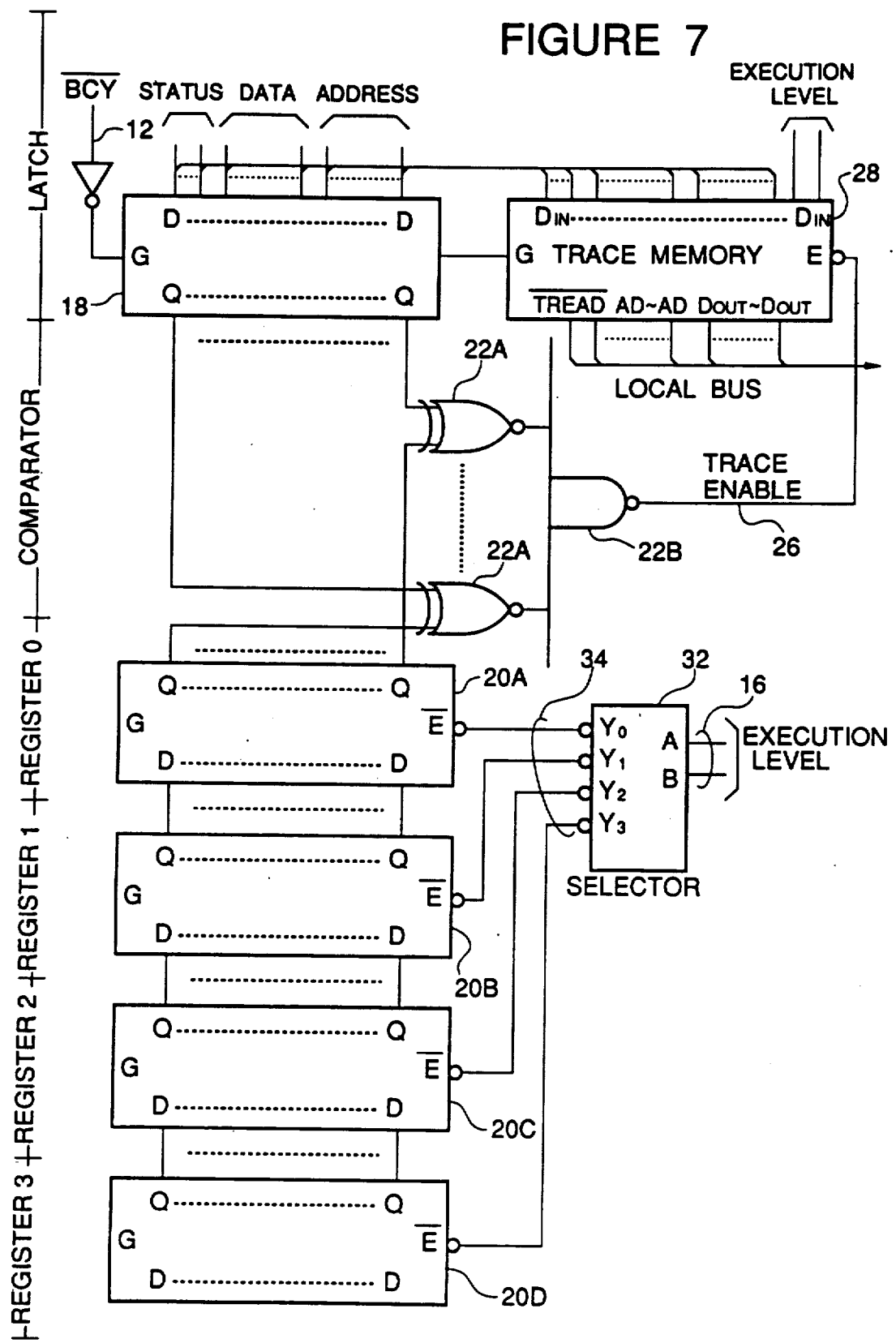
FIG. 7 is a logic circuit diagram illustrating the latch circuit, the comparator and the register used in the in-circuit emulator shown in FIG. 6.

Referring to FIGS. 6 and 7, FIG. 6 shows a block diagram of a second embodiment of the in-circuit emulator in accordance with the present invention, and FIG. 7 shows a logic circuit diagram illustrating the latch circuit, the comparator and the register used in the in-circuit emulator shown in FIG. 6. In these figures, elements similar or corresponding to those shown in FIGS. 1 and 2 are given the same Reference Numerals, and explanation thereof will be omitted.

As seen from comparison between FIGS. 1 and 6, the second embodiment is such that the execution level information 16 supplied to the trace memory 28 is not suppled to the latch circuit 18, but supplied to a selector 32 which outputs a select signal 34 to the register 20. In addition, as seen from comparison between FIGS. 2 and 7, the second embodiment is such that the register 20 includes a plurality of registers 20A, 20B, 20C and 20D corresponding to different execution levels, respectively, and the selector 32 decodes the execution level information 16 so as to selectively enable one of registers 20A, 20B, 20C and 20D designated by the execution level information 16. In the shown example, since the register 20 includes four registers 20A, 20B, 20C and 20D, the execution level information 16 is composed of 2 bits, and the execution level is divided into four levels "0" to "3".

In the second embodiment shown in FIGS. 6 and 7, since one register 20A, 20B, 20C or 20D is provided for each of different execution levels, it is possible to simultaneously trace different execution levels, for example, an operating system and an application program under respective conditions.

Specifically, the address, status and the input/output date other than the execution level are compared between the latch circuit 18 and the register 20. On the other hand, the execution level is decoded by the selector 32 and the active low enable signal is suppled to one of the registers 20A, 20B, 20C and 20D in the form of the select signal 34. The register 20A, 20B, 20C or 20D receiving the active low enable signal at the terminal $\overline{E}$ is selected, and the other registers receiving a high level signal at their terminal $\overline{E}$ brings their Q terminals into a high impedance condition. The result of comparison between the content of the latch circuit 18 and the selected one register 20A, 20B, 20C or 20D is outputted the trace memory 28 as the trace enable signal, namely, the trace on/off control signal.

As seen from the above description made with reference to the accompanying drawings, in the in-circuit emulator in accordance with the present invention, the emulation CPU directly outputs the execution level information. The execution level information outputted from the emulation CPU is latched in a latch circuit, and the content of the latch circuit is compared with the content of a register holding an execution level information to be traced. If the contents of the latch circuit and the register is consistent with each other, an enable signal is outputted to a trace memory which is supplied with various information of the emulation CPU, so that the various information is stored in the trace memory. As a result, only the result of execution belonging to a selected execution level, of the result of execution of a program which is executed at a plurality of different execution levels, is traced in the trace memory.

The invention has thus been shown and described with reference to the specific embodiments. However, it should be noted that the present invention is in no way limited to the details of the illustrated structures but changes and modifications may be made within the scope of the appended claims.

I claim:

1. An in-circuit emulator comprising an emulation microprocessor for directly outputting at least an address and an execution level information, a latch circuit for latching at least the address outputted from the emulation microprocessor, a register device composed of a plurality of registers corresponding to different execution levels to be traced, a selector receiving the execution level information outputted from the emulation microprocessor for selecting one of the plurality of registers corresponding to the execution level information, a comparator receiving respective contents of the latch circuit and the selected register for generating an enable signal when the content latched in the latch circuit is consistent with a content of the selected register, and a trace memory coupled to receive the address outputted from the emulation microprocessor and responding to the enable signal so as to store the address outputted from the emulation microprocessor, whereby only a result of execution belonging to a selected execution level is traced in the trace memory.

2. An in-circuit emulator claimed in claim 1 further including a supervisor microprocessor coupled to the register device for changing the content of the respective registers.

* * * * *